(12) United States Patent
Wu et al.

(10) Patent No.: US 8,966,050 B2
(45) Date of Patent: Feb. 24, 2015

(54) DATA CENTRE SYSTEM AND METHOD FOR A DATA CENTRE TO PROVIDE SERVICE

(75) Inventors: Jiaoren Wu, Beijing (CN); Tao Liu, Beijing (CN); Ning Liu, Beijing (CN); Cheng Zhang, Beijing (CN); Jiang Fu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/346,653

(22) PCT Filed: Jul. 17, 2012

(86) PCT No.: PCT/CN2012/078773
§ 371 (c)(1),
(2), (4) Date: Mar. 21, 2014

(87) PCT Pub. No.: WO2013/040942
PCT Pub. Date: Mar. 28, 2013

(65) Prior Publication Data
US 2014/0258496 A1    Sep. 11, 2014

(30) Foreign Application Priority Data
Sep. 23, 2011    (CN) .......................... 2011 1 0286977

(51) Int. Cl.
*G06F 15/173*    (2006.01)
*H04L 12/803*    (2013.01)
*H04L 29/08*    (2006.01)
*H04L 29/06*    (2006.01)

(52) U.S. Cl.
CPC .......... *H04L 47/125* (2013.01); *H04L 67/1002* (2013.01); *H04L 29/06* (2013.01)
USPC .......................................... 709/223; 709/226

(58) Field of Classification Search
None
See application file for complete search history.

(56) References Cited

U.S. PATENT DOCUMENTS

| 2005/0213585 | A1* | 9/2005 | Sturm et al. ............. 370/395.31 |
| 2008/0304482 | A1* | 12/2008 | Grassi et al. ................. 370/389 |
| 2010/0103837 | A1* | 4/2010 | Jungck et al. ................ 370/252 |
| 2010/0157799 | A1* | 6/2010 | Nice et al. ..................... 370/235 |
| 2010/0228813 | A1* | 9/2010 | Suzuki et al. ................. 709/203 |
| 2011/0153827 | A1* | 6/2011 | Yengalasetti et al. ......... 709/226 |
| 2011/0153831 | A1* | 6/2011 | Mutnuru et al. .............. 709/226 |

FOREIGN PATENT DOCUMENTS

| CN | 101834831 | 9/2010 |
| CN | 102075921 | 5/2011 |

* cited by examiner

*Primary Examiner* — Hamza Algibhah
*Assistant Examiner* — James Edwards
(74) *Attorney, Agent, or Firm* — Hodgson Russ LLP (57) ABSTRACT

A data center system and a method for a data center to provide service are provided. The data center system comprises at least one first load balancing device, a plurality of second load balancing devices, and a plurality of servers. The first load balancing device is configured to transmit the first type network request to one of the plurality of second load balancing devices with a first scheduling strategy. The second load balancing device is configured to convert the first type network request to a second type network request, and to transmit the second type network request after the source address and destination address translation to one of the plurality of servers with a second scheduling strategy. The server is configured to generate a second type network response according to the second type network request and to return the second type network response to a corresponding second load balancing device.

20 Claims, 5 Drawing Sheets

DATA CENTRE SYSTEM AND METHOD FOR A DATA CENTRE TO PROVIDE SERVICE

CROSS REFERENCE TO RELATED APPLICATION

This application claims priority and benefits of Chinese Patent Application No. 201110286977.0, filed with State Intellectual Property Office, P. R. C. on Sep. 23, 2011, the entire content of which is incorporated herein by reference.

FIELD

Embodiments of the present disclosure generally relate to a communication field, more particularly, to a data center system, and a method for a data center to provide service.

BACKGROUND

IPv6 (Internet Protocol Version 6) is a next generation internet protocol replacing the current internet protocol IPv4 (Internet Protocol Version 4). Advantages of IPv6 with respect to IPv4 are: a larger address space, smaller routing tables and additional supports for enhanced multicast and for stream, and thus IPv6 has a considerable development opportunity and provides a great network platform for service quality control. Therefore, how to migrate network data in IPv4 network to IPv6 network is a key problem in present network service researches.

The conventional method for data migration between IPv4 and IPv6 includes the following three ones:

(1) Dual Stack Technology

Figure 1:
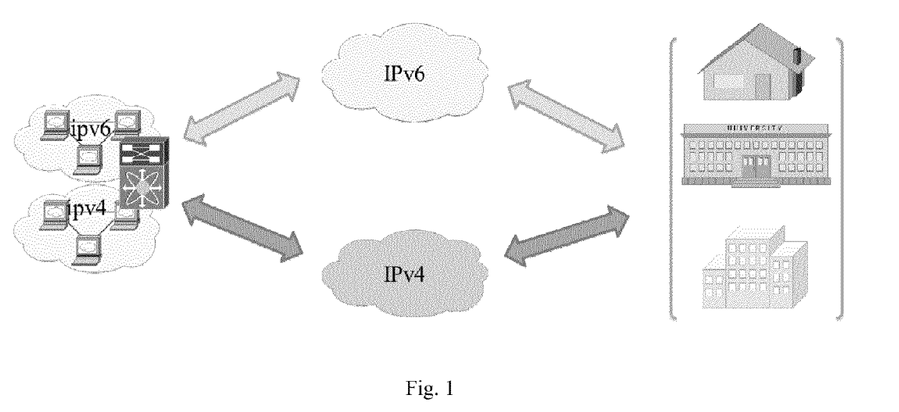
FIG. 1 is a schematic diagram illustrating services providing between different types of networks via a conventional dual stack.

As shown in FIG. 1, the dual stack requires that all network devices in the data center system should be equipped with IPv4/IPv6 internet protocol, which has a high deployment cost and some old devices do not support the IPv6 internet protocol. In addition, the dual stack has a high requirement for the network's own performance, and many existing devices are not evaluated for IPv6, and thus the risk is uncontrollable. In the dual stack technology, the IPv4 network and the IPv6 network are independent from each other, and a data communication between each other is blocked.

(2) NAT (Network Address Translation) 64/DNS (Domain Name System) 64

NAT64 is a stateful network address and protocol translation technology, which generally supports initiating a connection from an IPv6 user to access IPv4 resources. However, NAT64 also supports initiating a connection from the IPv4 user to access IPv6 resources actively via manually configuring static mappings. NAT64 can realize the network address and protocol translation between IPv6 and IPv4 under the TCP (Transmission Control Protocol), UDP (User Datagram Protocol) and ICMP (Internet Control Message Protocol). DNS64 mainly cooperates with the NAT64 to synthesize an A recording (IPv4 address) in DNS query information into an AAAA record (IPv6 address), and to return the synthetic AAAA record to the IPv6 user. DNS64 also avoids the defects of DNS-ALG in NAT-PAT. NAT64 commonly cooperates with DNS64 and no modification is required in the IPv6 client or in the IPv4 server. NAT64 solves most of the defects in NAT-PT and cooperates with DNS64, which is different from the DNS-ALG in NAT-PT.

Figure 2:
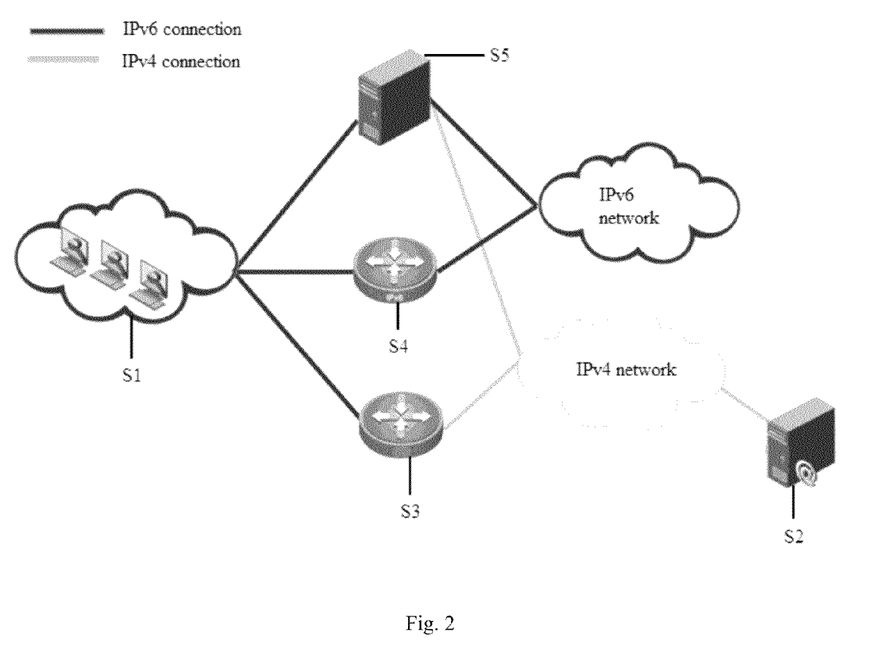
FIG. 2 is a schematic diagram of network application scene of conventional NAT64 and DNS64.

FIG. 2 illustrates a common application scene network of NAT64 and DNS64. As shown in FIG. 2, a DNS64 server and a NAT64 router are independent from each other, in which 64:FF9B::/96 is a domain name prefix special of DNS64 and is commonly defaulted to be used to synthesize the network address from the IPv4 address to the IPv6 address, meanwhile the domain name prefix can also be used as a translation prefix of NAT64, and only when a traffic matching with the prefix is achieved, can the NAT64 translation be performed. This prefix is commonly denoted as pref64::/n, and can be configured according to practical network deployments. When the IPv6 user initiates a connection to access common IPv6 websites, the traffic is matched to an IPv6 default route and is forwarded to an IPv6 router directly. When the IPv6 user initiates a connection to an IPv4 single stack server, the address is synthesized with the domain name prefix by the DNS64 server, and the traffic in pref64::/n network segment is routed to the NAT64 router, thus achieving the network address and protocol translation between IPv4 and IPv6 and accessing resources in IPv4 network.

Figure 3:
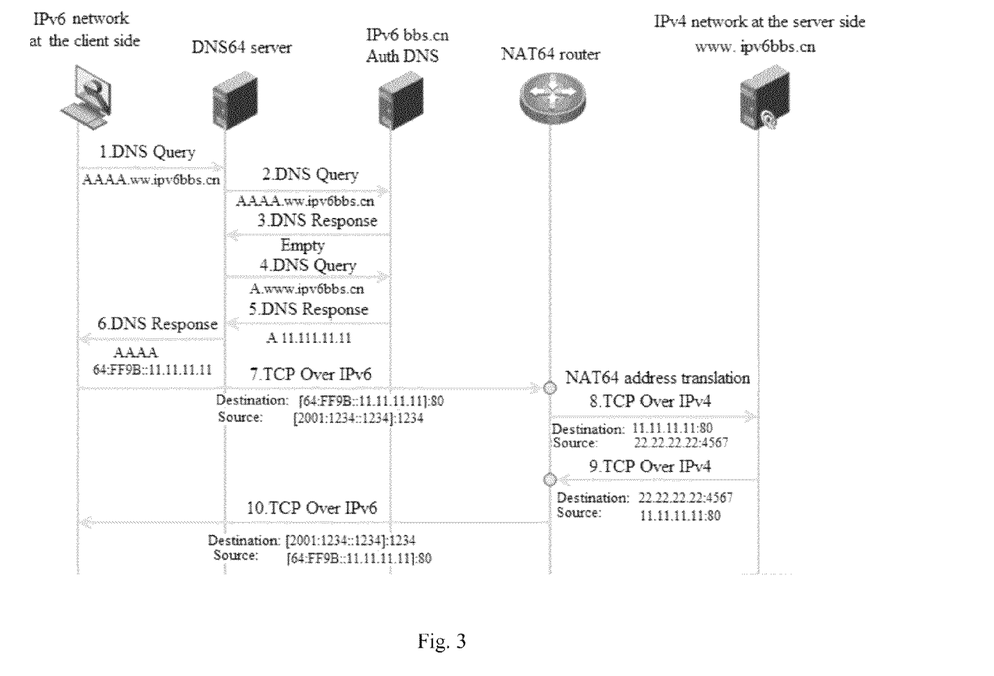
FIG. 3 is a schematic diagram of a communication process between conventional NAT64 and DNS64.

FIG. 3 illustrates a message interaction process between DNS64 and NAT64. As shown in FIG. 3, structures of a network address are shown as follows:

IPv6 Only Client: 2001::1234::1234;
Pref64::/n: 64:FF9B::/96
NAT64 Public IPv4 Address: 22.22.22.22
WWW.IPV6BBS.CN IPv4 Address: 11.11.11.11

Defects of NAT64/DNS64 are shown as follows:

(A) A strong coupling with DNS is required;
(B) Only a connection initiated by the IPv6 user to access IPv4 resources is supported, being commonly deployed at the user side;
(C) Stateful address mappings exist;
(D) A large number of public IP addresses are required in the address pool.

(3) IVI (The Transition to IPv6)

Figure 4:
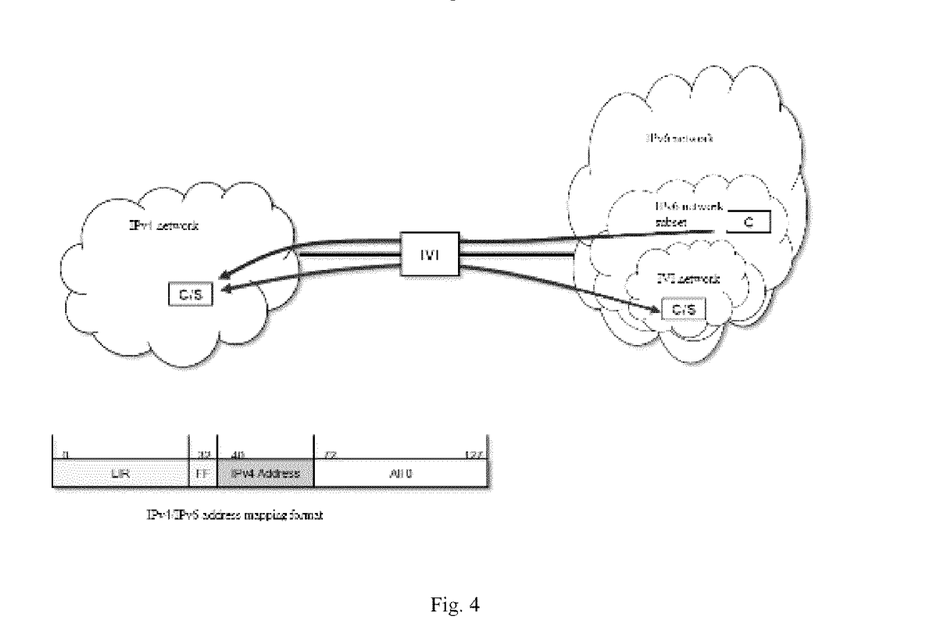
FIG. 4 is a schematic diagram illustrating a one to one mapping between IPv6 address subsets and IPv4 addresses via a conventional IVI.

FIG. 4 illustrates a one to one mapping between IPv6 address subsets and IPv4 addresses. As shown in FIG. 4, IPv6 address subsets are mapped with the IPv4 addresses one to one, such that the mapped address subset and IPv6 address can communicate with each other. However, the IVI has following defects:

(A) IVI is not adapted to be applied in IDC (Internet Data Center);
(B) A strong coupling with DNS is required;
(C) IVI is commonly deployed in an ISP (Internet Service Provider) network.

Accordingly, the conventional methods for data migration between IPv4 and IPv6 have a high deployment cost, a high risk and a certain deployment limitation, which may not satisfy the migration requirement of the large scale data center.

SUMMARY

Embodiments of the present disclosure seek to solve at least one of the problems existing in the prior art to at least some extent.

Accordingly, a first objective of the present disclosure is to provide a data center system, which can provide service between different types of networks simply and transparently without changing the current IDC network structure, without needing large scale system and application upgrade.

A second objective of the present disclosure is to provide a method for a data center to provide service.

A third objective of the present disclosure is to provide a four-layer load balancing device, which can distribute and transmit the network traffic to the back-end load balancing device according to the scheduling strategy.

A fourth objective of the present disclosure is to provide a seven-layer load balancing device, which can distribute and transmit the network traffic to the back-end server according to the scheduling strategy, but also illustrate different types of networks.

A fifth objective of the present disclosure is to provide a method for deploying a data center system, which can deploy corresponding types of load balancing devices in different network development stages, so as to satisfy the network performance requirement.

In order to achieve above objectives, according to embodiments of a first broad aspect of the present disclosure, a data center system is provided. The data center system includes at least one first load balancing device connected with a core network device, a plurality of second load balancing devices each connected with the at least one first load balancing device, and a plurality of servers each connected with the plurality of second load balancing devices, in which the first load balancing device is configured to receive a first type network request sent from a client via the core network device and to transmit the first type network request to one of the plurality of second load balancing devices with a first scheduling strategy; the second load balancing device is configured to receive the first type network request sent from the first load balancing device, to convert the first type network request to a second type network request, to apply a source address and destination address translation on the second type network request and to transmit the second type network request after the source address and destination address translation to one of the plurality of servers with a second scheduling strategy; and the server is configured to receive the second type network request sent from the second load balancing device, to generate a second type network response according to the second type network request and to return the second type network response to a corresponding second load balancing device.

According to embodiments of the present disclosure, the data center system can provide service between different types of networks simply and transparently without changing the current IDC network structure, without needing large scale system and application upgrade. In addition, the reliability of the system operation can be improved via a two-layer load balance.

According to embodiments of a second broad aspect of the present disclosure, a method for the data center system to provide service is provided. The method includes: sending a first type network request to a first load balancing device by a client via a core network device; transmitting the first type network request to one of a plurality of second load balancing devices with a first scheduling strategy by the first load balancing device; converting the first type network request sent from the first load balancing device to a second type network request, applying a source address and destination address translation on the second type network request and transmitting the second type network request to one of a plurality of servers with a second scheduling strategy by the second load balancing device; and receiving the second type network request sent from the second load balancing device and generating a second type network response according to the second type network request by the server.

According to embodiments of the present disclosure, the method for the data center to provide service can provide service between different types of networks simply and transparently without changing the current IDC network structure, without needing large scale system and application upgrade.

According to embodiments of a third broad aspect of the present disclosure, a four-layer load balancing device is provided. The four-layer load balancing device includes a first transmitting module connected with a core network device and configured to receive a first type network request sent from a client via the core network device; a first source and destination translating module configured to apply a source address and destination address translation on the first type network request; and a first load balancing module connected with one of a plurality of seven-layer load balancing devices and configured to transmit the first type network request after the source address and destination address translation to the one of the plurality of seven-layer load balancing devices connected with the four-layer load balancing device with a first scheduling strategy.

According to embodiments of the present disclosure, the four-layer load balancing device can distribute and transmit the network traffic to back-end load balancing devices, so as to expand bandwidths of network devices and servers, to improve the throughput capacity, to enhance the network data processing capacity and to improve the flexibility and operability of a network.

According to embodiments of a fourth broad aspect of the present disclosure, a seven-layer load balancing device is provided. The seven-layer load balancing device includes: a second transmitting module connected with one of a plurality of four-layer load balancing devices and configured to receive a first type network request sent from the one of the plurality of four-layer load balancing devices; a network converting module configured to convert the first type network request to a second type network request; a second source and destination translating module configured to apply a source and destination address translation on the second type network request; and a second load balancing module connected with one of a plurality of servers and configured to transmit the second type network request after the source address and destination address translation to the one of the plurality of servers with a second scheduling strategy.

According to embodiments of the present disclosure, the seven-layer load balancing device can convert the first type network request to the second type network request so as to provide service between different types of networks, and distribute and transmit network traffic to back-end servers so as to expand bandwidths of network devices and servers, to improve the throughput capacity, to enhance the network data processing capacity and to improve the flexibility and operability of a network.

According to embodiments of a fifth broad aspect of the present disclosure, a method for deploying a data center system is provided. The method includes: detecting a traffic distributing state of a first type network and a second type network in a current network and deploying a first load balancing device and a second load balancing device according to the traffic distributing state of the first type network and the second type network, in which when a ratio between the first type network traffic and the second type network traffic is less than a first threshold, the first load balancing device and the second load balancing device are deployed in the current network at the same time, in which the first load balancing device is configured to distribute and transmit the first type network traffic to the second load balancing device; when a ratio between the first type network traffic and the second type network traffic is equal to or higher than the first threshold, only the first load balancing device is deployed in the current network so as to distribute and transmit the first type network traffic to the back-end server.

According to embodiments of the present disclosure, in different network development stages, the method for deploying the data center system can deploy corresponding types of load balancing devices and remove load balancing devices that can result in network traffic bottleneck, so as to satisfy the network performance requirement in different network development stages. Thus, the network has high flexibility.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

With reference to the following descriptions and drawings, these and other aspects of embodiments of the present disclosure will be distinct. In the descriptions and drawings, some particular embodiments are described in order to shown means of the principles of embodiments according to the present disclosure, however, it should be appreciated that the scope of embodiments according to the present disclosure is not limited. On the contrary, embodiments of the present disclosure include all the changes, alternatives, and modifications falling into the scope of the spirit and principles of the attached claims.

A data center system 100 according to embodiments of the present disclosure will be described with reference to FIG. 5.

Figure 5:
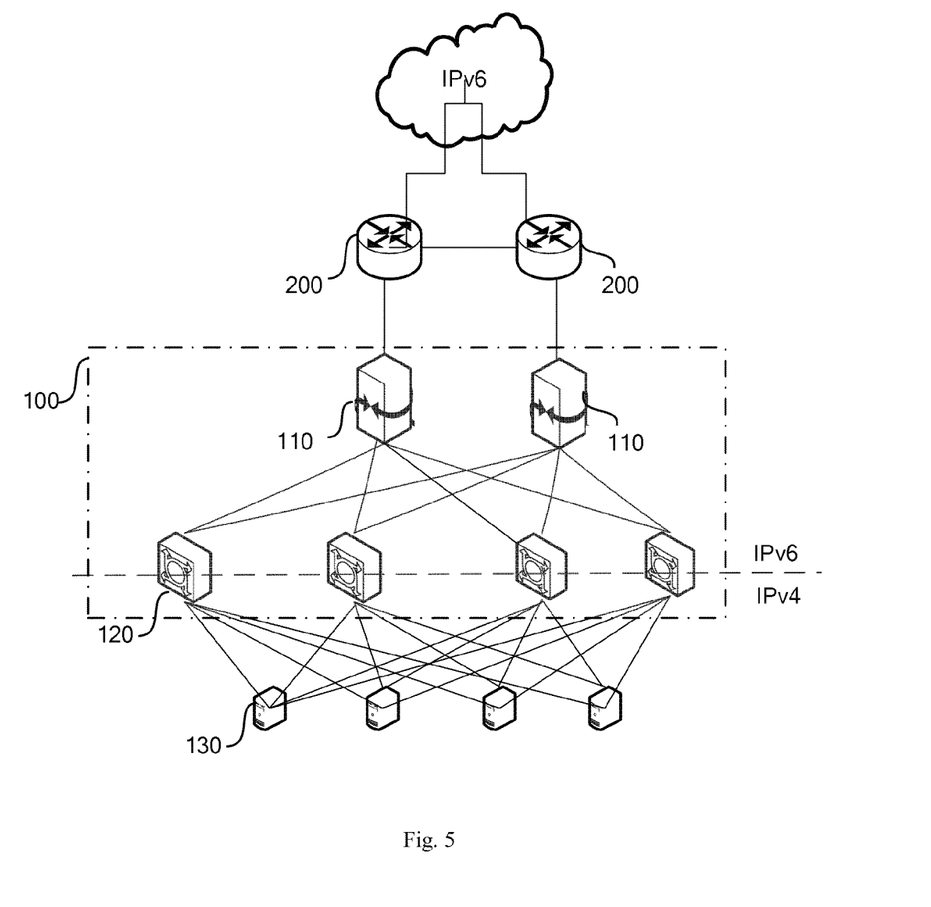
FIG. 5 is a schematic diagram of a data center system according to an embodiment of the present disclosure.

As shown in FIG. 5, the data center system 100 according to embodiments of the present disclosure includes a plurality of first load balancing devices 110, a plurality of second load balancing devices 120 and a plurality of servers 130, in which the plurality of first load balancing devices 110 are connected with a core network device 200, and each of the plurality of second load balancing devices 120 is connected with the plurality of first load balancing devices 110, and each of the plurality of servers 130 is connected with the plurality of second load balancing devices 120.

The first load balancing device 110 is configured to receive a first type network request sent from a client via the core network device 200, to apply a source address and destination address translation on the first type network request and to transmit the first type network request after the source address and destination address translation to one of the plurality of second load balancing devices 120 with a first scheduling strategy.

The second load balancing device 120 is configured to receive the first type network request after the source address and destination address translation sent from the first load balancing device 110, to convert the first type network request after the source address and destination address translation to a second type network request, to apply a source address and destination address translation on the second type network request and to transmit the second type network request after the source address and destination address translation to one of the plurality of servers 130 with a second scheduling strategy.

Each of the plurality of servers 130 is configured to receive the second type network request sent from the second load balancing device 120, to generate a second type network response according to the second type network request and to return the second type network response to a corresponding second load balancing device 120.

The second load balancing device 120 is further configured to convert the second type network response returned from the server 130 to a first type network response, and to return the first type network response to a corresponding first load balancing device 110, and the corresponding first load balancing device 110 is further configured to return the first type network response to a corresponding client.

According to embodiments of the present disclosure, the data center system can provide service between different types of networks simply and transparently without changing the current IDC network structure, without needing large scale system and application upgrade.

It should be noted that, in above embodiments of the present disclosure, the plurality of first load balancing devices 100 are taken as an example to describe the data center system, which is a preferred embodiment of the present disclosure. In other embodiments of the present disclosure, the number of the first load balancing devices 110 may be one. In this embodiment, when the number of the first load balancing devices 110 is one, it is not required for the first load balancing device 110 to apply the source address and destination address translation on the first type network request.

The first load balancing device 110 applies the source address and destination address translation on the first type network request. In this way, the second load balancing device 120 can return the network response to the corresponding first load balancing device 110 when returning a network response. Specifically, the first load balancing device 110 sets its own address as a source address of the first type network request, which is recorded as a first source address, and sets an address of the second load balancing device 120 selected with the first scheduling strategy as a destination address of the first type network request, which is recorded as a first destination address. Therefore, when returning data packet to the first load balancing device 110, the second load balancing device 120 returns the data packet to the corresponding first load balancing device 110 according to the first source address set at this time. For example, the second load balancing device 120 can return the first type network response to the corresponding first load balancing device 110 according to the first source address. In addition, the first load balancing device 110 stores a previous first source address, when applying the source address and destination address translation on the first type network request, such that the first type network response returned by the second load balancing device 120 can be returned to the corresponding client according to the above first source address.

In an embodiment of the present disclosure, the first load balancing device 110 is further configured to apply a source port and destination port translation on the first type network request. Similar to the first load balancing device 110 applying the source address and destination address translation on the first type network request, the first load balancing device 110 sets its own port as a source port of the first type network request, which is recorded as a first source port, and sets a port of the second load balancing device 120 selected with the first scheduling strategy as a destination port of the first type network request, which is recorded as a first destination port. Therefore, when returning data packet to the first load balancing device 110, the second load balancing device 120 returns the data packet to the corresponding first load balancing device 110 according to the first source port set at this time. For example, the second load balancing device 120 can return the first type network response to the corresponding first load balancing device 110 according to the first source port. In addition, the first load balancing device 110 stores a previous first source port, when applying the source port and destination port translation on the first type network request, such that the first type network response returned by the second load balancing device 120 can be returned to the corresponding client according to the above first source port.

The first load balancing device 110 transmits the first type network request after the source address and destination address translation to the second load balancing device 120 corresponding to the first destination address with the first scheduling strategy, in which the first scheduling strategy includes a polling mode, a five-tuple array hash strategy and a source address hash strategy. It should be understood that the first scheduling strategy should not be limited to these, and the above first scheduling strategy is exemplary and is not used to limit the protection scope of the present disclosure.

The second load balancing device 120 converts the first type network request to the second type network request, and converts the second type network response to the first type network response by SOCKET. Then, the second load balancing device 120 applies the source address and destination address translation on the second type network request and transmits the second type network request after the source address and destination address translation to one of the plurality of servers 130 with the second scheduling strategy.

Specifically, the second load balancing device 120 sets its own address as a source address of the second type network request, which is recorded as a second source address, and sets an address of the server 130 selected with the second scheduling strategy as a destination address of the second type network request, which is recorded as a second destination address. It should be understood that the second source address is the same as the first destination address. Therefore, when returning data packet to the second load balancing device 120, the server 130 returns the data packet to the corresponding second load balancing device 120 according to the second source address set at this time. For example, the server 130 can return the second type network response to the corresponding second load balancing device 120 according to the second source address. In addition, the second load balancing device 120 stores a previous second source address, when applying the source address and destination address translation on the second type network request, such that the second type network response returned by the server 130 can be returned to the corresponding first load balancing device 110 according to the above second source address.

In an embodiment of the present disclosure, the second load balancing device 120 is further configured to apply a source port and destination port translation on the second type network request. Specifically, the second load balancing device 120 sets its own port as a source port of the second type network request, which is recorded as a second source port, and sets a port of the server 130 selected with the second scheduling strategy as a destination port of the second type network request, which is recorded as a second destination port. Therefore, when returning data packet to the second load balancing device 120, the server 130 returns the data packet to the corresponding second load balancing device 120 according to the second source port set at this time. For example, the server 130 can return the second type network response to the corresponding second load balancing device 120 according to the second source port. In addition, the second load balancing device 120 stores a previous second source port, when applying the source port and destination port translation on the second type network request, such that the second type network response returned by the server 130 can be returned to the corresponding first load balancing device 110 according to the above second source port.

The second load balancing device 120 transmits the second type network request after the source address and destination address translation to the server 130 corresponding to the second destination address with the second scheduling strategy, in which the second scheduling strategy includes a polling mode, a universal resource locator (URL) scheduling strategy, a universal resource locator hash scheduling strategy and a consistent hash scheduling strategy. It should be understood that the second scheduling strategy should not be limited to these, and the above second scheduling strategy is exemplary and is not used to limit the protection scope of the present disclosure.

The second load balancing device 120 converts the second type network response returned from the server 130 to the first type network response. In an embodiment of the present disclosure, the second load balancing device 120 converts the first type network request to the second type network request, and converts the second type network response to the first type network response by SOCKET. Then, the second load balancing device 120 transmits the first type network response to the corresponding first load balancing device 110 according to the set second source address, and the first load balancing device 110 transmits the above first type network response to the corresponding client.

In an embodiment of the present disclosure, the first type network may be an IPv6 network and the second type network may be an IPv4 network. Accordingly, the first type network request is an IPv6 request and the second network request is an IPv4 request. The first type network response is an IPv6 response and the second type network response is an IPv4 response.

In an embodiment of the present disclosure, the first load balancing device 110 may be a four-layer load balancing device and the second load balancing device 120 may be a seven-layer load balancing device, in which the data center system 100 may include a plurality of first load balancing devices 110 and a plurality of second load balancing devices 120. Furthermore, the plurality of first load balancing devices 110 cooperate with each other in an active/standby redundancy mode or in a cluster mode, and the plurality of second load balancing devices 120 cooperate with each other in an active/standby redundancy mode or in a cluster mode. Thus, a fault occurring in one of the first load balancing devices 110 or in one of the second load balancing devices 120 will not influence the operation of the whole data center system 100, thus improving the operation safety of the whole data center system 100.

According to embodiments of the present disclosure, the data center system 100 can provide service between different types of networks simply and transparently without changing the current IDC network structure, without needing large scale system and application upgrade.

A method for a data center to provide service according to embodiments of the present disclosure will be described in the following with reference to FIG. 6.

Figure 6:
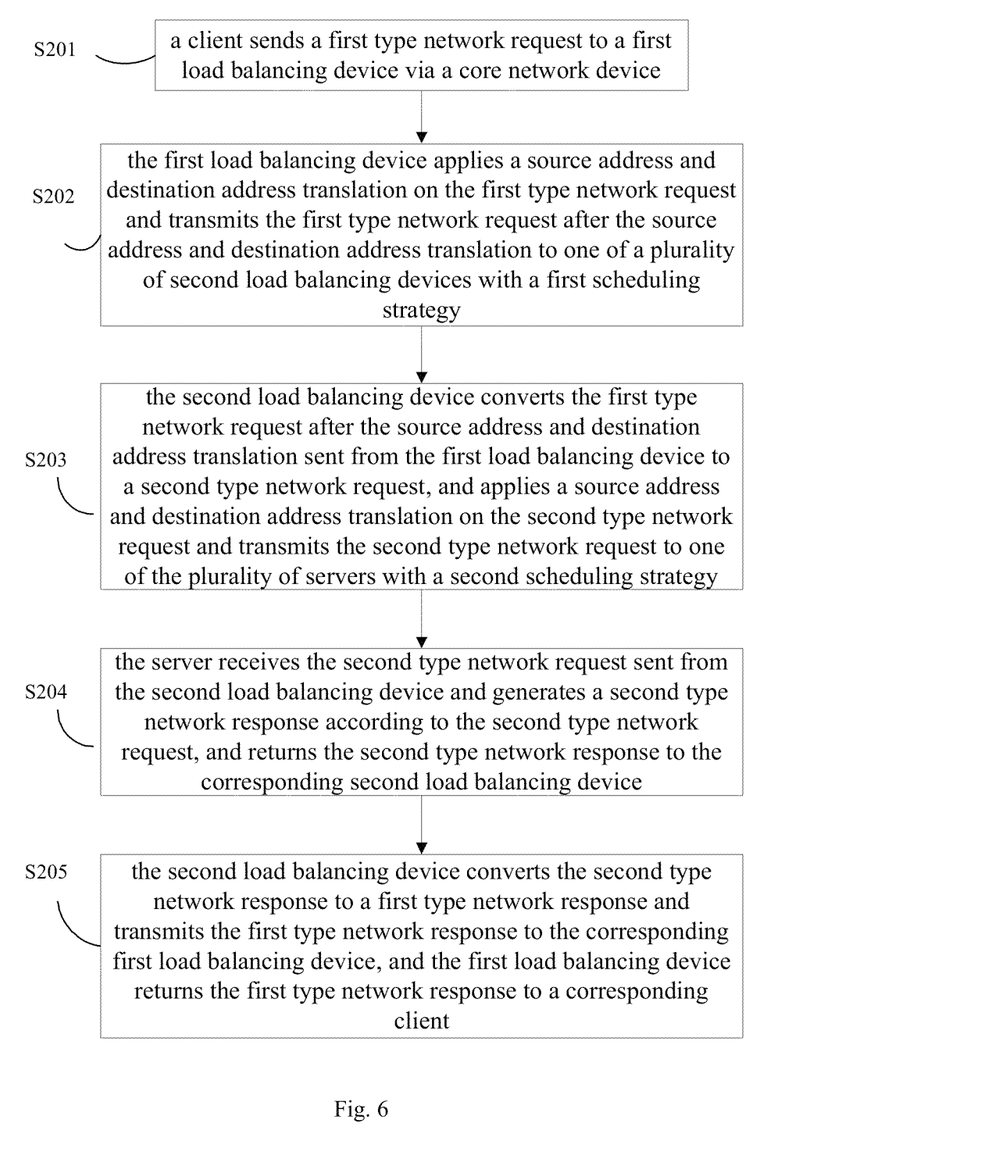
FIG. 6 is a flow chart of a method for a data center to provide service according to an embodiment of the present disclosure.

As shown in FIG. 6, the method for a data center to provide service includes the following steps.

At step 201: a client sends a first type network request to a first load balancing device via a core network device.

At step 202: the first load balancing device applies a source address and destination address translation on the first type network request and transmits the first type network request after the source address and destination address translation to one of a plurality of second load balancing devices with a first scheduling strategy.

Specifically, the first load balancing device sets its own address as a source address of the first type network request, which is recorded as a first source address, and sets an address of the second load balancing device selected with the first scheduling strategy as a destination address of the first type network request, which is recorded as a first destination address. Therefore, when a data packet is required to be returned to the first load balancing device, the second load balancing device returns the data packet to the corresponding first load balancing device according to the first source address set at this time. In addition, the first load balancing device stores a previous first source address, when applying the source address and destination address translation on the first type network request, such that the data packet can be returned to the corresponding client according to the above first source address.

In an embodiment of the present disclosure, step 202 further includes: applying a source port and destination port translation on the first type network request by the first load balancing device. Similar to the first load balancing device applying the source address and destination address translation on the first type network request, the first load balancing device sets its own port as a source port of the first type network request, which is recorded as a first source port, and sets a port of the second load balancing device selected with the first scheduling strategy as a destination port of the first type network request, which is recorded as a first destination port. Therefore, when a data packet is required to be returned to the first load balancing device, the second load balancing device returns the data packet to the corresponding first load balancing device according to the first source port set at this time. In addition, the first load balancing device stores a previous first source port, when applying the source port and destination port translation on the first type network request, such that the data packet can be returned to the corresponding client according to the above first source port.

The first load balancing device transmits the first type network request after the source address and destination address translation to the second load balancing device corresponding to the first destination address with the first scheduling strategy. In an embodiment, the first scheduling strategy includes a polling mode, a five-tuple array hash strategy and a source address hash strategy. It should be understood that the first scheduling strategy should not be limited to these, and the above first scheduling strategy is exemplary and is not used to limit the protection scope of the present disclosure.

At step 203, the second load balancing device converts the first type network request after the source address and destination address translation sent from the first load balancing device to a second type network request, and applies a source address and destination address translation on the second type network request and transmits the second type network request to one of the plurality of servers with a second scheduling strategy.

In this step, the second load balancing device converts the first type network request to the second type network request by SOCKET. Then, the second load balancing device applies the source address and destination address translation on the second type network request and transmits the second type network request after source address and destination address translation to the one of the plurality of servers with the second scheduling strategy.

Specifically, the second load balancing device sets its own address as a source address of the second type network request, which is recorded as a second source address, and sets an address of the server selected with the second scheduling strategy as a destination address of the second type network request, which is recorded as a second destination address. It can be understood that the second source address is the same as the first destination address. Therefore, when returning the data packet to the second load balancing device, the server returns the data packet to the corresponding second load balancing device according to the second source address set at this time. In addition, the second load balancing device stores a previous second source address, when applying the source address and destination address translation on the second type network request, such that the data packet returned by the server can be returned to the corresponding first load balancing device according to the above second source address.

In an embodiment of the present disclosure, the step 203 further includes the following steps. The second load balancing device sets its own port as a source port of the second type network request, which is recorded as a second source port, i.e., the second source port is the same as the first destination port, and the second load balancing device sets a port of the server selected with the second scheduling strategy as a destination port of the second type network request, which is recorded as a second destination port. Therefore, when returning the data packet to the second load balancing device, the server returns the data packet to the corresponding second load balancing device according to the second source port set at this time. In addition, the second load balancing device stores a previous second source port, when applying the source port and destination port translation on the second type network request, such that the data packet returned by the server can be returned to the corresponding first load balancing device according to the above second source port.

The second load balancing device transmits the second type network request after the source address and destination address translation to the server corresponding to the second destination address with the second scheduling strategy. In an embodiment of the present disclosure, the second scheduling strategy includes a polling mode, a universal resource locator scheduling strategy, a universal resource locator hash scheduling strategy and a consistent hash scheduling strategy. It should be understood that the second scheduling strategy should not be limited to these, and the above second scheduling strategy is exemplary and is not used to limit the protection scope of the present disclosure.

At step 204: the server receives the second type network request sent from the second load balancing device and generates a second type network response according to the second type network request, and returns the second type network response to the corresponding second load balancing device.

At step 205: the second load balancing device converts the second type network response to a first type network response and transmits the first type network response to the corresponding first load balancing device, and the first load balancing device returns the first type network response to a corresponding client.

In an embodiment of the present disclosure, the second load balancing device converts the second type network response to the first type network response by SOCKET. The second load balancing device returns the first type network response to the corresponding first load balancing device according to the second source address set at step 203, and the first load balancing device returns the first type network response to the corresponding client according to the first source address.

It should be understood that the first type network request and the first network response belong to a same network type, and the second type network request and the second type network response belong to a same network type.

In an embodiment of the present disclosure, the first type network may be an IPv6 network and the second type network may be an IPv4 network. Accordingly, the first type network request is an IPv6 request and the second network request is an IPv4 request. The first type network response is an IPv6 response and the second type network response is an IPv4 response.

In an embodiment of the present disclosure, the first load balancing device may be a four-layer load balancing device and the second load balancing device may be a seven-layer load balancing device, in which there are a plurality of first load balancing devices and a plurality of second load balancing devices. Furthermore, the plurality of first load balancing devices cooperate with each other in an active/standby redundancy mode or in a cluster mode, and the plurality of second load balancing devices cooperate with each other in an active/standby redundancy mode or in a cluster mode. Thus, a fault occurring in one of the first load balancing devices or in one of the second load balancing devices will not influence the operation of the whole data center system, thus improving the operation safety of the whole data center system.

According to embodiments of the present disclosure, the method for the data center to provide service can provide service between different types of networks simply and transparently without changing the current IDC network structure, without needing large scale system and application upgrade.

A four-layer load balancing device 300 according to embodiments of the present disclosure will be described in the following with reference to FIG. 7.

Figure 7:
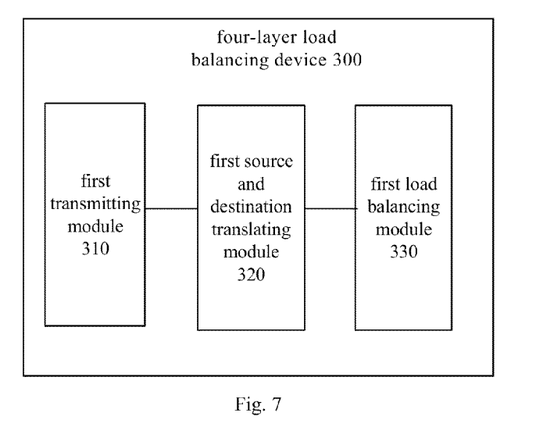
FIG. 7 is a schematic diagram of a four-layer load balancing device according to an embodiment of the present disclosure.

As shown in FIG. 7, the four-layer load balancing device 300 includes a first transmitting module 310, a first source and destination translating module 320 and a first load balancing module 330.

The first transmitting module 330 is connected with a core network device and configured to receive a first type network request sent from a client via the core network device, such as an IPv6 request. The first source and destination translating module 320 is configured to apply a source address and destination address translation on the first type network request.

The first load balancing module 330 is connected with one of a plurality of second load balancing devices (i.e., seven-layer load balancing devices) and configured to transmit the first type network request after the source address and destination address translation to the one of the plurality of second load balancing devices connected with the four-layer load balancing device with a first scheduling strategy.

According to embodiments of the present disclosure, the four-layer load balancing device can distribute and transmit the network traffic to back-end load balancing devices according to the scheduling strategy, so as to expand bandwidths of network devices and servers, to improve the throughput capacity, to enhance the network data processing capacity and to improve the flexibility and operability of a network.

In an embodiment of the present disclosure, the second load balancing device may a seven-layer load balancing device.

The first source and destination translating module 320 applies the source address and destination address translation on the first type network request sent from the client via the core network device. Specifically, the first source and destination translating module 320 sets an address of the four-layer load balancing device 300 as a source address of the first type network request, which is recorded as a first source address, and sets an address of the second load balancing device selected with the first scheduling strategy as a destination address of the first type network request, which is recorded as a first destination address. Therefore, when returning data packet to the four-layer load balancing device 300, the second load balancing device returns the data packet to the corresponding four-layer load balancing device 300 according to the first source address set at this time. In addition, the four-layer load balancing device 300 stores a previous first source address, when applying the source address and destination address translation on the first type network request, such that the data packet can be returned to the corresponding client according to the above first source address by the first transmitting module 310.

In an embodiment of the present disclosure, the first source and destination translating module 320 is further configured to apply a source port and destination port translation on the first type network request. Specifically, the first source and destination translating module 320 sets a port of the four-layer load balancing device 300 as a source port of the first type network request, which is recorded as a first source port, and sets a port of the second load balancing device selected with the first scheduling strategy as a destination port of the first type network request, which is recorded as a first destination port. Therefore, when returning data packet to the four-layer load balancing device 300, the second load balancing device returns the data packet to the corresponding four-layer load balancing device 300 according to the first source port set at this time. For example, the second load balancing device returns the first type network response to the four-layer load balancing device 300, and the four-layer load balancing device 300 further returns the first type network response to the corresponding client. In addition, the four-layer load balancing device 300 stores a previous first source port, when applying the source port and destination port translation on the first type network request, such that the data packet can be returned to the corresponding client according to the above first source port by the first transmitting module 310.

The four-layer load balancing device 300 distributes and transmits the network traffic to the back-end second load balancing devices based on the TCP/IP protocol, and transmits the first type network after the source address and destination address translation to the second load balancing device corresponding to the first destination address with the first scheduling strategy. In an embodiment of the present disclosure, the first scheduling strategy includes a polling mode, a five-tuple array hash strategy and a source address hash strategy. It should be understood that the first scheduling strategy should not be limited to these, and the above first scheduling strategy is exemplary and is not used to limit the protection scope of the present disclosure.

In an embodiment of the present disclosure, the four-layer load balancing device 300 further includes a first defending module and a first back-end checking module.

The first defending module is configured to defend the four-layer load balancing device 300 against attacks. Specifically, the first defending module has a four-layer DDoS (Distributed Denial of Service) defending function, which mainly defends against service attacks in a transmission layer, such as attacks aiming at SYN/ACK flag. Specifically, the first defending module can provide defending measures against SYN FLOOD attack and ACK STORM attack.

The first back-end checking module is configured to check a present serving state and device state of the four-layer load balancing device 300 and to process fault automatically when a fault occurs in the four-layer load balancing device 300. Specifically, during the operation of the four-layer load balancing device 300, when a fault occurs in a service or a machine, the first back-end checking module detects and processes the fault automatically, so as to ensure the normal operation of the four-layer load balancing device 300. Thus, the operation of the whole device cannot be influenced by the fault in a certain service or machine.

According to embodiments of the present disclosure, the four-layer load balancing device can distribute and transmit the network traffic to the back-end load balancing devices according to the scheduling strategy, so as to expand bandwidths of the network devices and servers, to improve the throughput capacity, to enhance the network data processing capacity and to improve the flexibility and operability of a network.

A seven-layer load balancing device 400 according to embodiments of the present disclosure will be described in the following with reference to FIG. 8.

Figure 8:
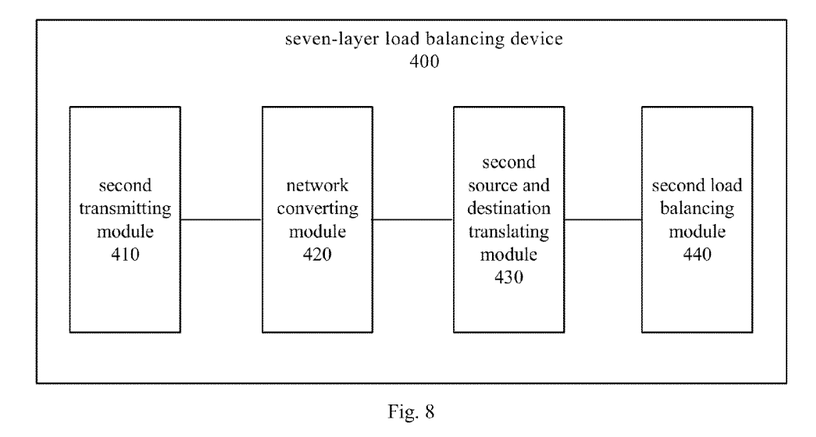
FIG. 8 is a schematic diagram of a seven-layer load balancing device according to an embodiment of the present disclosure.

As shown in FIG. 8, the seven-layer load balancing device 400 according to embodiments of the present disclosure includes a second transmitting module 410, a network converting module 420, a second source and destination translating module 430 and a second load balancing module 440.

The second transmitting module 410 is connected with one of a plurality of first load balancing devices (i.e., four-layer load balancing devices) and configured to receive a first type network request after a source address and destination address translation sent from the one of the plurality of first load balancing devices, such as an IPv6 request. The network converting module 420 is configured to convert the first type network request after the source address and destination address translation to a second type network request, such as an IPv4 request. The second source and destination translating module 430 is configured to apply a source address and destination address translation on the second type network request. The second load balancing module 440 is connected with one of a plurality of servers and configured to transmit the second type network request after the source address and destination address translation to the one of the plurality of servers with a second scheduling strategy.

According to embodiments of the present disclosure, the seven-layer load balancing device can convert the first type network request to the second type network request so as to provide service between different types of networks, and distribute and transmit network traffic to back-end servers so as to expand bandwidths of network devices and servers, to improve the throughput capacity, to enhance the network data processing capacity and to improve the flexibility and operability of a network.

In an embodiment of the present disclosure, the first load balancing device may be a four-layer load balancing device.

In another embodiment of the present disclosure, the network converting module 420 can convert the first type network request after the source address and destination address translation to the second type network request by SOCKET.

The second source and destination translating module 430 applies the source address and destination address translation on the second type network request sent from the network converting module 420. Specifically, the second source and destination translating module 430 sets an address of the seven-layer load balancing device 400 as a source address of the second type network request, which is recorded as a second source address, and sets an address of the server selected with the second scheduling strategy as a destination address of the second type network request, which is recorded as a second destination address. Therefore, when returning data packet to the seven-layer load balancing device 400, the server returns the data packet to the corresponding seven-layer load balancing device 400 according to the second source address set at this time. In addition, the seven-layer load balancing device 400 stores a previous second source address, when applying the source address and destination address translation on the second type network request, such that the data packet can be returned to the corresponding first load balancing device according to the above second source address by the second transmitting module 410.

In an embodiment of the present disclosure, the second source and destination translating module 430 is further configured to apply a source port and destination port translation on the second type network request. Specifically, the second source and destination translating module 430 sets a port of the seven-layer load balancing device 400 as a source port of the second type network request, which is recorded as a second source port, and sets a port of the server selected with the second scheduling strategy as a destination port of the second type network request, which is recorded as a second destination port. Therefore, when returning data packet to the seven-layer load balancing device 400, the server returns the data packet to the corresponding seven-layer load balancing device 400 according to the second source port set at this time. In addition, the seven-layer load balancing device 400 stores a previous second source port, when applying the source port and destination port translation on the second type network request, such that the data packet can be returned to the corresponding the first load balancing device according to the above second source port by the second transmitting module 410.

The seven-layer load balancing device 400 distributes and transmits the network traffic to the back-end servers based on URL characteristics, and transmits the second type network request after the source address and destination address translation to the server corresponding to the second destination address with the second scheduling strategy. In an embodiment of the present disclosure, the second scheduling strategy includes a polling mode, a universal resource locator scheduling strategy, a universal resource locator hash scheduling strategy and a consistent hash scheduling strategy. It should be understood that the second scheduling strategy should not be limited to these, and the above second scheduling strategy is exemplary and is not used to limit the protection scope of the present disclosure.

The server receives the second type network request sent from the seven-layer load balancing device 400 and generates a corresponding second type network response. Furthermore, the server returns the above second type network response to the corresponding seven-layer load balancing device 400 according to the second source address. The network converting module 420 is further configured to convert the second type network response returned from the server to a first type network response, and the first type network response is transmitted to the corresponding first load balancing device by the second transmitting module 410.

In an embodiment of the present disclosure, the seven-layer load balancing device 400 further includes a second defending module and a second back-end checking module.

The second defending module is configured to defend the seven-layer load balancing device 400 against attacks. Specifically, the second defending module has a seven-layer DDoS (Distributed Denial of Service) defending function, which mainly defends against service attacks in an application layer. Specifically, the second defending module can provide defending measures against URL threshold banning attack and IP threshold banning attack.

The second back-end checking module is configured to check a present serving state and device state of the seven-layer load balancing device 400 and to process fault automatically when a fault occurs in the seven-layer load balancing device 400. Specifically, during the operation of the seven-layer load balancing device 400, when a fault occurs in a service or a machine, the second back-end checking module detects and processes the fault automatically, so as to ensure the normal operation of the seven-layer load balancing device 400. Thus, the operation of the whole device cannot be influenced by the fault in a certain service or machine.

According to embodiments of the present disclosure, the seven-layer load balancing device can convert the first type network request to the second type network request so as to provide service between different types of networks, and distribute and transmit network traffic to the back-end servers so as to expand bandwidths of the network devices and servers, to improve the throughput capacity, to enhance the network data processing capacity and to improve the flexibility and operability of the network.

A method for deploying a data center system according to embodiments of the present disclosure will be described in the following with reference to FIG. 9. The data center system may be the data center system 100 according to the above embodiments of the present disclosure.

Figure 9:
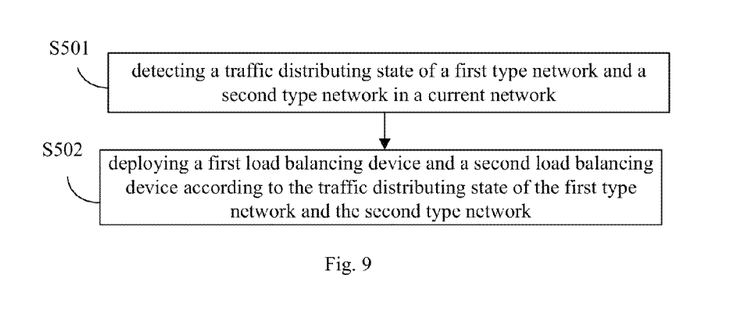
FIG. 9 is a flow chart of a method for deploying a data center system according to an embodiment of the present disclosure.

As shown in FIG. 9, the method for deploying the data center system includes the following steps.

At step 501: a traffic distributing state of a first type network and a second type network in a current network is detected.

At step 502: a first load balancing device and a second load balancing device in the network are deployed according to the traffic distributing state of the first type network and the second type network.

When a ratio between the first type network traffic and the second type network traffic is less than a first threshold, the first load balancing device and the second load balancing device are deployed in the current network at the same time, in which the first load balancing device is configured to distribute and transmit the first type network traffic to the back-end second load balancing device; when a ratio between the first type network traffic and the second type network traffic is equal to or higher than the first threshold, only the first load balancing device is deployed in the current network so as to distribute and transmit the first type network traffic to the back-end server.

According to embodiments of the present disclosure, in different network development stages, the method for deploying the data center system can deploy corresponding types of load balancing devices and remove load balancing devices that can result in network traffic bottleneck, so as to satisfy the network performance requirement in different network development stages. Thus, the method has high flexibility.

In an embodiment of the present disclosure, the first type network is an IPv6 network and the second type network is an IPv4 network. The method for deploying the data center system will be described in the following by tacking the IPv6 network and the IPv4 network as an example.

First, a traffic distributing state of the IPv6 network and the IPv4 network in the current network is detected, and then the first load balancing device and the second load balancing device are deployed according to the traffic distributing state of the IPv6 network and the IPv4 network. In an embodiment of the present disclosure, the first load balancing device is a four-layer load balancing device and the second load balancing device is a seven-layer load balancing device.

Specifically, when a ratio between the IPv6 network traffic and the IPv4 type network traffic is less than a first threshold, i.e., the current network is in an initial stage of the IPv6 network and the IPv6 network traffic is small, the four-layer load balancing device and the seven-layer load balancing device are deployed in the current network at the same time, in which the seven-layer load balancing device adopts a dual stack, i.e., the seven-layer load balancing device adopts an IPv4 stack and an IPv6 stack. The four-layer load balancing device transmits an IPv4 request to a back-end business server directly, but distributes and transmits the traffic of an IPv6 request to the back-end seven-layer load balancing device. For example, the four-layer load balancing device distributes and transmits the traffic to the back-end seven-layer load balancing device with a first scheduling strategy, in which the first scheduling strategy includes a polling mode, a five-tuple array hash strategy and a source address hash strategy. The seven-layer load balancing device converts the IPv6 request sent from the four-layer load balancing device to the IPv4 request and transmits the IPv4 request to the back-end business server, and the back-end business server generates a response to the IPv4 request.

When a ratio between the IPv6 network traffic and the IPv4 network traffic is higher than the first threshold but lower than a second threshold or is higher than the second threshold, only the four-layer load balancing device is deployed in the network so as to distribute and transmit the IPv6 network traffic to the back-end business server. Specifically, when the ratio between the IPv6 network traffic and the IPv4 network traffic is higher than the first threshold but lower than the second threshold, the current network is in a medium stage of the IPv6 network, the IPv6 network traffic is approximately equal to the IPv4 network traffic, only the four-layer load balancing device is deployed in the current network, such that a network traffic bottleneck resulting from the seven-layer load balancing device can be avoided. A front-end business server is configured as a dual stack server, i.e., the server adopts the dual stack including the IPv4 stack and the IPv6 stack, such that the server can access the four-layer load balancing device and serves as a back-end server thereof. Furthermore, the four-layer load balancing device can distribute and transmit the traffic to the back-end server.

When the ratio between the IPv6 network traffic and the IPv4 network traffic is higher than the second threshold, only the four-layer load balancing device is deployed in the current network to distribute and transmit the IPv6 network traffic to the back-end business server. Specifically, when the ratio between the IPv6 network traffic and the IPv4 network traffic is higher than the second threshold, the current network is in a later stage of the IPv6 network, just a small part of the IPv4 traffic is in the current network. Thus, the front-end business server is configured as the dual stack server, i.e., the server adopts the dual stack including the IPv4 stack and the IPv6 stack, such that the server can access the four-layer load balancing device and serves as the back-end server thereof. Furthermore, the four-layer load balancing device can distribute and transmit the traffic to the back-end server.

When the IPv4 network traffic in the current network is zero, it indicates that a transition stage of IPv4/IPv6 is over and the current network is the IPv6 network. Thus, the server adopts the IPv6 stack so as to access the four-layer load balancing device directly and serves as the back-end server thereof. The four-layer load balancing device can distribute and transmit the network traffic to the back-end server.

According to embodiments of the present disclosure, in different network development stages, the method for deploying the data center system can deploy corresponding types of load balancing devices and remove load balancing devices that can result in network traffic bottleneck, so as to satisfy the network performance requirement in different network development stages. Thus, the method has high flexibility.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the phrases throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A data center system, comprising:
at least one first load balancing device connected with a core network device, a plurality of second load balancing devices each connected with the at least one first load balancing device, and a plurality of servers each connected with the plurality of second load balancing devices, wherein:
the first load balancing device is configured to receive a first type network request sent from a client via the core network device and to transmit the first type network request to one of the plurality of second load balancing devices with a first scheduling strategy;
the second load balancing device is configured to receive the first type network request sent from the first load balancing device, to convert the first type network request to a second type network request, to apply a source address and destination address translation on the second type network request and to transmit the second type network request after the source address and destination address translation to one of the plurality of servers with a second scheduling strategy; and
the server is configured to receive the second type network request sent from the second load balancing device, to generate a second type network response according to the second type network request and to return the second type network response to a corresponding second load balancing device.

2. The data center system according to claim 1, comprising a plurality of first load balancing devices, wherein each of the plurality of second load balancing devices is connected with the plurality of first load balancing devices.

3. The data center system according to claim 1, wherein the second load balancing device is further configured to convert the second type network response returned from the server to a first type network response, and to return the first type network response to a corresponding first load balancing device, and the corresponding first load balancing device is further configured to return the first type network response to a corresponding client.

4. The data center system according to claim 3, wherein the second load balancing device converts the first type network request to the second type network request, and converts the second type network response to the first type network response by SOCKET.

5. The data center system according to claim 1, wherein the first type network is an IPv6 network and the second type network is an IPv4 network.

6. The data center system according to claim 1, wherein the first load balancing device is a four-layer load balancing device and the second load balancing device is a seven-layer load balancing device.

7. The data center system according to claim 1, wherein the first load balancing device is further configured to apply a source port and destination port translation on the first type network request; the second load balancing device is further configured to apply a source port and destination port translation on the second type network request.

8. The data center system according to claim 1, wherein the first scheduling strategy comprises a polling mode, a five-tuple array hash strategy and a source address hash strategy; the second scheduling strategy comprises a polling mode, a universal resource locator scheduling strategy, a universal resource locator hash scheduling strategy and a consistent hash scheduling strategy.

9. The data center system according to claim 1, wherein:
a traffic distributing state of a first type network and a second type network in a current network is detected and the first load balancing device and the second load balancing device are deployed according to the traffic distributing state of the first type network and the second type network;

when a ratio between the first type network traffic and the second type network traffic is less than a first threshold, the first load balancing device and the second load balancing device are deployed in the current network at the same time, in which the first load balancing device is configured to distribute and transmit the first type network traffic to the second load balancing device; when a ratio between the first type network traffic and the second type network traffic is equal to or higher than the first threshold, only the first load balancing device is deployed in the current network so as to distribute and transmit the first type network traffic to the back-end server.

10. The data center system according to claim 9, wherein when the ratio between the first type network traffic and the second type network traffic is less than the first threshold, the second load balancing device adopts a dual stack comprising an IPv6 stack and an IPv4 stack.

11. The data center system according to claim 9, wherein when a ratio between the first type network traffic and the second type network traffic is higher than the first threshold but lower than a second threshold, or a ratio between the first type network traffic and the second type network traffic is higher than the second threshold, the server adopts the dual stack comprising an IPv6 stack and an IPv4 stack.

12. The data center system according to claim 9, wherein when the second type network traffic in the current network is zero, the server adopts an IPv6 stack.

13. A method for a data center to provide service, comprising:
sending a first type network request to a first load balancing device by a client via a core network device;
transmitting the first type network request to one of a plurality of second load balancing devices with a first scheduling strategy by the first load balancing device;
converting the first type network request sent from the first load balancing device to a second type network request, applying a source address and destination address translation on the second type network request and transmitting the second type network request to one of a plurality of servers with a second scheduling strategy by the second load balancing device; and
receiving the second type network request sent from the second load balancing device and generating a second type network response according to the second type network request by the server.

14. The method according to claim 13, further comprising:
returning the second type network response to a corresponding second load balancing device by the server; and
converting the second type network response to a second type network response and returning the first type network response to a corresponding first load balancing device by the second load balancing device, and returning the first type network response to a corresponding client by the first load balancing device.

15. The method according to claim 14, wherein the second load balancing device converts the first type network request to the second type network request, and converts the second type network response to the first type network response by SOCKET.

16. The method according to claim 13, wherein the first type network is an IPv6 network and the second type network is an IPv4 network.

17. The method according to claim 13, wherein the first load balancing device is a four-layer load balancing device and the second load balancing device is a seven-layer load balancing device.

18. The method according to claim 13, further comprising applying a source port and destination port translation on the first type network request by the first load balancing device; applying a source port and destination port translation on the second type network request by the second load balancing device.

19. The method according to claim 13, wherein the first scheduling strategy comprises a polling mode, a five-tuple array hash strategy and a source address hash strategy; the second scheduling strategy comprises a polling mode, a universal resource locator scheduling strategy, a universal resource locator hash scheduling strategy and a consistent hash scheduling strategy.

20. A non-transitory computer readable storage medium storing executable program instructions which when executed cause a data center to perform a method of providing service, wherein the data center comprises at least one first load balancing device connected with a core network device, a plurality of second load balancing devices each connected with the at least one first load balancing device, and a plurality of servers each connected with the plurality of second load balancing devices, and the method comprises:
sending a first type network request to the first load balancing device by a client via the core network device;
transmitting the first type network request to one of the plurality of second load balancing devices with a first scheduling strategy by the first load balancing device;
converting the first type network request sent from the first load balancing device to a second type network request, applying a source address and destination address translation on the second type network request and transmitting the second type network request to one of the plurality of servers with a second scheduling strategy by the second load balancing device; and
receiving the second type network request sent from the second load balancing device and generating a second type network response according to the second type network request by the server.

* * * * *